United States Patent [19]

Zuck

[11] Patent Number: 4,928,907
[45] Date of Patent: May 29, 1990

[54] COMPOUND HELICOPTER WITH NO TAIL ROTOR

[75] Inventor: Daniel R. Zuck, Sylmar, Calif.
[73] Assignee: Y & B Investment Corporation, Sylmar, Calif.
[21] Appl. No.: 161,714
[22] Filed: Feb. 29, 1988
[51] Int. Cl.⁵ .............................................. B64C 27/22
[52] U.S. Cl. ...................... 244/6; 244/7 C; 244/48
[58] Field of Search ............... 244/7 R, 7 A, 7 B, 7 C, 244/6, 48, 82

[56] References Cited

U.S. PATENT DOCUMENTS

| | | | |
|---|---|---|---|
| 2,959,373 | 11/1960 | Zuck | 244/7 C |
| 3,029,043 | 4/1962 | Churchill | 244/7 C |
| 3,166,271 | 1/1965 | Zuck | 244/7 C |
| 3,197,157 | 7/1965 | King | 244/7 C |
| 3,572,612 | 3/1971 | Irbitis | 244/7 C |

*Primary Examiner*—Galen Barefoot

[57] ABSTRACT

This helicopter invention uniquely has no anti-torque tail rotor. The tail propeller is used only for forward thrust during the airplane mode of flight and during the transition from vertical helicopter flight to forward airplane mode of flight, when the helicopter rotor may be feathered in a no-lift attitude.

The anti-torque balancing forces during the hovering mode are developed by the differentially controlled aileron forces when the wings are aligned vertically with the vertically downward airflow from the helicopter rotor.

There is also a vertically moveable horizontal airfoil on the tail cone, or tail boom, with controllable means which can provide anti-torque reaction forces during the helicopter hovering mode from the lifting rotor down flow air.

An angular moveable tail fin assembly and rudder are provided to improve transition from VTOL hovering flight to horizontal airplane flight. Means are provided to electronically schedule transition from the VTOL to horizontal cruise flight sensed by the wing attitude which can control the angular attitude of the fin and rudder in a completely computerized automatic transition to and from VTOL and airplane flight mode.

9 Claims, 11 Drawing Sheets

COMPOUND HELICOPTER WITH NO TAIL ROTOR

Figure 1:
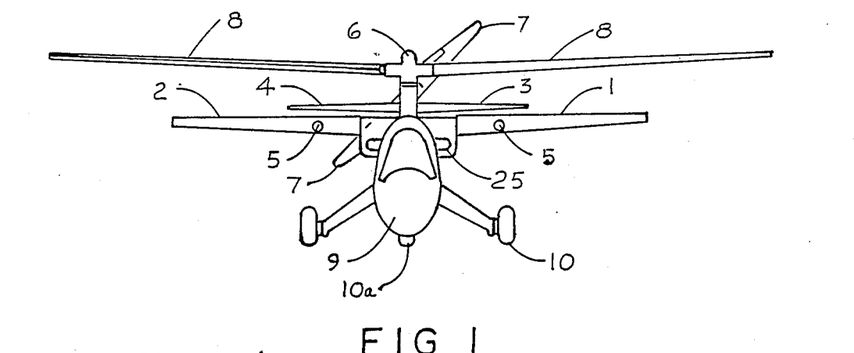
FIG. 1 is a front view of the Compound Helicopter.
Figure 2:
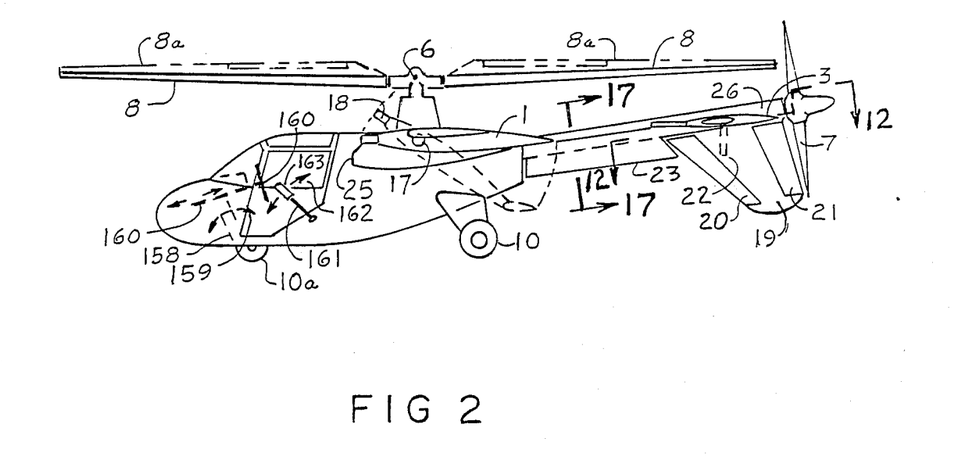
FIG. 2 is a side view of the Compound Helicopter.

This invention relates to a compound helicopter with no tail rotor having a pusher or tractor propeller for flight in an airplane configuration and transition to airplane flight. The said helicoptor has two modes of flight: First as a helicoptor for VTOL flight, and second for cross-country flight as an airplane configuration with the ligting rotor of the helicoptor stopped and the wings supporting the flight in conventional airplane winged flight with the wings substantially parallel to the path of flight. The configuration of this compound helicopter is shown in the FIGS. 1, 2, and 3. FIG. 2 shows the helicopter in the cruising flight mode as an airplane with the lifting rotor feathered in the fore and aft position for minimum drag and high speed flight. FIG. 5A shows the compound helicopter with the wings vertical into the rotor airstream down flow with the wing ailerons producing anti-torque and directional control forces.

The primary object of this invention is to disclose the means to directionally control the compound helicopter and provide means producing anti-torque forces to the lifting rotor from differential forces on the wings rotated to the rotor air down flow.

A second object of this invention is to disclose a means to counter-act the lifting rotor torque in the tail boom or tail cone from the lift, rotor down flow air.

Another object is to disclose a compound helicopter with flight transition means from VTOL to airplane flight mode using a variable angle vertical tail fin and rubber assembly.

Another object is to disclose how the differential movement of the ailerons on the wings can control direction of the helicopter in hovering and to provide anti-torque forces to counter the lifting rotor torque.

In my prior patents on compound helicopters I have disclosed numerous parts supporting this invention of the compound helicopter in the following patents: Patent number 2,420,764 Helicopter Directional Propeller; patent number 2,776,718 Helicopter Rotor; patent number 2,959,373 Convertaplane; and patent number 3,563,496 Compound Helicopter.

In the said above patent 3,563,496 Compound Helicopter the absence of a tail rotor was also an object of the invention. However, the vibration from the cyclic control of the propeller to produce the anti-torque force was severe. The method to accomplish that goal in this invention will not produce the vibration and high maintenance on a complex mechanism. It is therefore a superior and unique means and less complex in eliminating the tail rotor.

How the foregoing objects and advantages are obtained together with others, which will occur to those skilled in the art, will be apparent from the following description making reference to the accompanying drawings to which:

FIG. 23 is omitted phantom relation to the wings in FIGS. 6A and 7 when hovering.

BACKGROUND OF THE INVENTION

Figure 3:
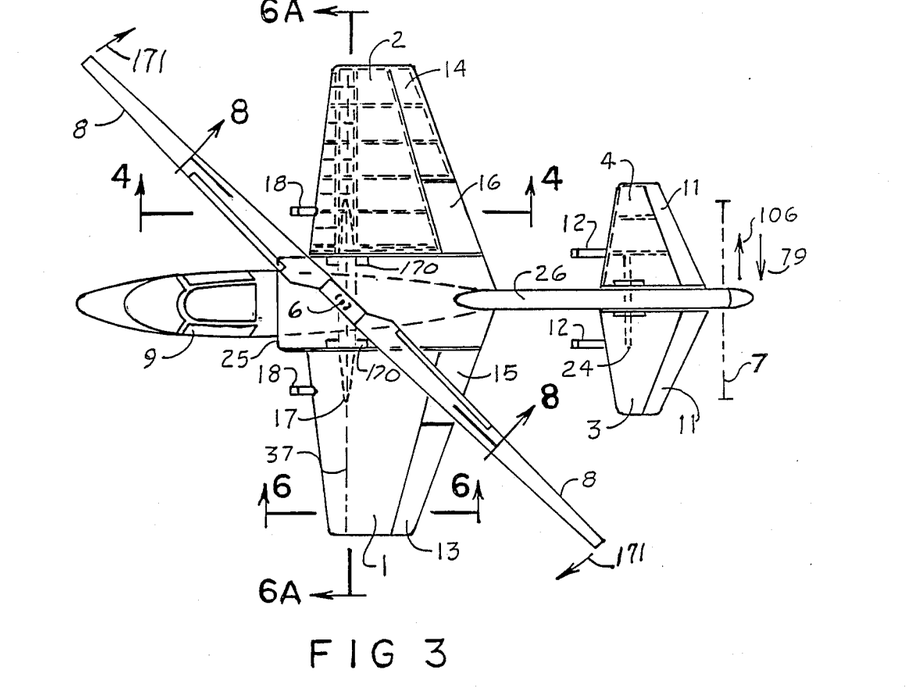
FIG. 3 is a plan view of the Compound Helicopter.
Figure 4:
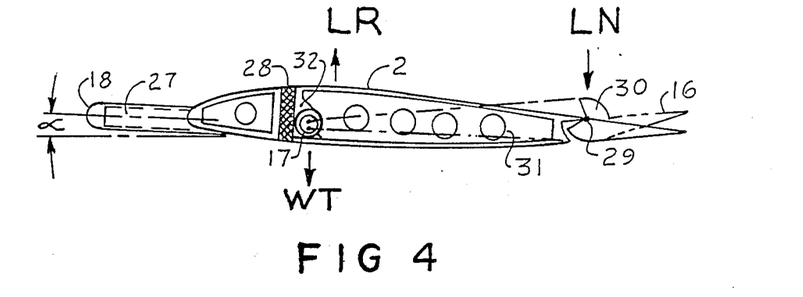
FIG. 4 is a section taken on line 4—4 in FIG. 3 showing the angular movement of the elevator surface on the wings.

In the applicant's patent number 3,563,496 Compound Helicopter and patent number 2,959,373 Convertaplane, the wings and helicopter rotor were disclosed to be compatible as they are shown in this application in FIGS. 5, 5A, 5B, and 5C. FIGS. 1, 2, and 3 are similar to the applicant's patent number 3,563,496 except for the anti-torque control shown in FIGS. 2 and 17; FIGS. 3, 6, 5A, 6A, and 7 differential aileron directional control; FIG. 4, and 3 elevator wing control; FIGS. 12, 12A, 13, and FIG. 2 vertical fin and propeller interaction during transition from VTOL hovering flight mode to the horizontal airplane flight mode.

FIGS. 8, 9, 10, 11, 14, 15, 16, 18, 21, 22, and 23 are similar to the applicant's patent number 3,563,496 Compound Helicopter and are essential in supporting the invention of the no-tail rotor means directional control and anti-torque means disclosed in this patent application.

SUMMARY OF THE INVENTION

The teaching of this patent disclosure reduces the complexity of the compound helicopter by eliminating the need for an anti-torque side rotor and directional control rotor. Although the applicant's patent number 3,563,496 Compound Helicopter also eliminated the tail rotor, the cyclic pitch control on said patented propeller during VTOL hover mode proved to be impractical because of its costly complex mechanism and the high cost of maintaining of the mechanism during flight operations. Vibration was excessive which introduced a safety hazard during the VTOL hovering mode, due to destructive vibration.

This disclosure also fixedly interconnects the right and left wings 1 and 2 through the wing rotation axle 17 allowing no differential movement between wings 1 and 2. This requires the wings to instantly move together. It was determined in radio controlled model flights that the roll control and the stability of independently supported free wings 1 and 2 are catatrophically divergent in roll stability and in roll control. Therefore, the wings 1 and 2 rotate on the axis 37 in unison and are rotationally controlled together in pitch by moveable elevator surface controls 15 and 16. For roll control in airplane flight mode, and directional control in VTOL hover flight mode the ailerons 13 and 14 move differentially as they do on a conventional fixed wing airplane flight. The wings are stable and controllable satisfactorily in pitch, and in roll with differential aileron movement independent of the elevator surfaces they are also stable and controllable satisfactorily.

DESCRIPTION OF THE PREFERRED EMBODIMENT

There are numerous helicopter configurations that can be utilized in assembling a helicopter for compounding with airplane wings as disclosed by the applicant. The preferred embodiment is as follows.

Figure 5:
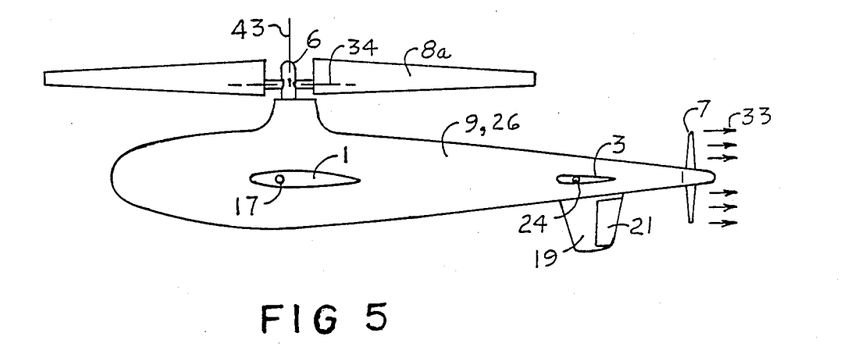
FIG. 5 is a schematic side view of the primary functional elements of the compound helicopter.
Figure 5A:
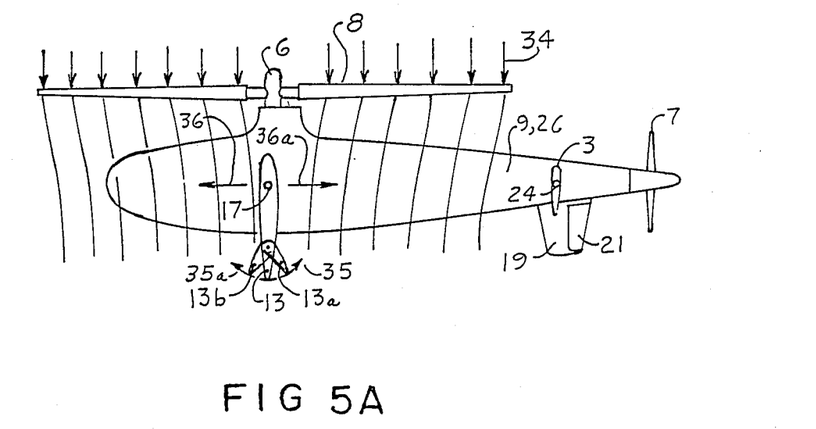
FIG. 5A is a similar schematic side view of FIG. 5 showing the downward airflow in hovering mode form the lifting rotor and its aerodunamic affect on the wings, ailerons and the horizontal tail.
Figure 5B:
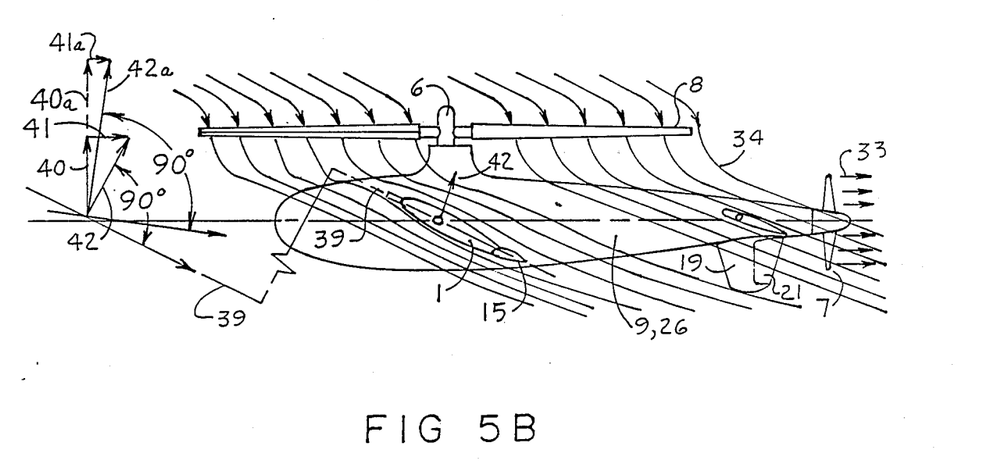
FIG. 5B is a similar schematic side view to FIG. 5 showing the downward and aft airflow from the lifting rotor during transition from hovering to forward flight.
Figure 5C:
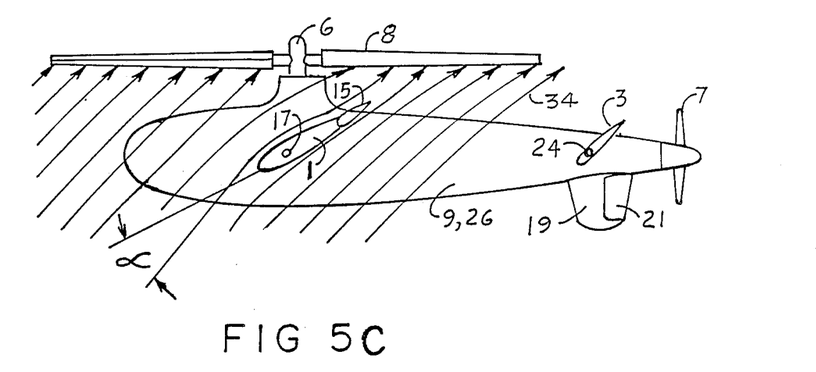
FIG. 5C is a similar schematic side view to FIG. 5 showing the aerodynamic airflow through the lifting rotor during an autorotation of the said lifting rotor in a power off glide of the compound helicopter.

To construct a compound helicopter with wings it is required for this invention that the wings 1 and 2 be free-floating as shown in FIGS. 2 and 3 for automatic angular response to the flow of air through the rotor as in FIGS. 5A, 5B, and 5C. FIG. 4 shows the wing floating elements and the elevator aerodyamic control 16 which causes the wing 2 to respond aerodynamically angularly about 37 in FIG. 3 on wing axle 17 in FIGS. 3 and 4. In said FIGS. 3 and 4 LR is point of balance of the aero lifting forces on the wing 2 which is aft of pitching axis 37 and wing axle 17. This produces a counter clockwise lifting force LR on axle 17 where the wt. of the total helicopter is suspended. The said LR force is balanced by the opposing clockwise aero force LN produced by the aerodynamic wing surface 16 rotatable on the axis 29 and controllable by the pilot through the control quadrant 30.

In order for these aero forces to work properly the wing 2 in FIG. 4 must be statically balanced so that the static structural weight of the wing 2 is in balance around axis 37 in FIG. 3 and 17 in FIG. 4. This equal balance point, or c.g. at 17 and 37 is accomplished by using a ballast weight 18 extending forward on an extended arm 27, assembly 5 in FIG. 1.

The wing now is free floating and responds directionally to to airflow and is controlled augularily for lift LR variation in the airflow by means of LN variation through pilot's control at 30. This is the fundamental compound helicopter wing configuration embodiment.

In FIGS. 3 and 1 the left and right wings 1 and 2, interconnected structurally by wing axle 17 in FIG. 3, are supported at the fuselage 9 on bearings 170 allowing the said wings to freely float aerodynamically. Both wings move instantly in unison angularily on axis 37 in FIG. 3. Consequently, for roll control of the compound helicopter, ailerons 13 and 14 are differentially actuated in the airplane flight mode. In the hovering flight mode VTOL in FIG. 5A the differential movement of ailerons 13 and 14 provide directional control of the helicopter body 9 and 26 offsetting the torque from the lifting rotor 8 in FIGS. 3, 5A, and 5B.

In FIG. 5 the compound helicopter is shown in the airplane flight mode with the wing 1 horizontal, the rotor 8 in the 8A stopped in feathered position for maximum cruise flight with minimum drag. The horizontal surface 3, in FIGS. 1, 2, and 3 are horizontal in airplane flight mode, and the propeller, FIGS. 5, 3, 1, and 2, produces the thrust 33 for forward airplane flight. The fin 19 and rudder 21 develop the directional control for the airplane flight mode.

In FIG. 5B the helicopter is transitioning from VTOL flight to horizontal airplane flight. The forward flight modifies the flow of the air through the rotor 8 and at same velocity creates a directional flow and wing 1 attitude as shown. The aft flow direction is created by the forward movement velocity of the aircraft, and the propeller 7 provides the thrust 33 and the wing 1 is taking up the lift of the helicopter and fin 19 and rudder 21 provide directional control. The VTOL function of the rotor 8 can drop out at some forward speed with the airflow approximately at this angle and the wing 1 in the angular attitude shown. As the wing 1 becomes more and more horizontal with increased speed, the differential ailerons produce roll control movements. As the wing 1 in augular attitude becomes more and more vertical with reduced forward airspeed from this position shown the differential ailerons produce directional control of 9 and 26 body about a vertical axis. In FIG. 5B note in the vector diagram to the left of FIG. 5B the force 42 is less than 42a when the wing 1 approaches horizontal; which is the increased roll control realized as the horizontal speed increases.

Figure 24:
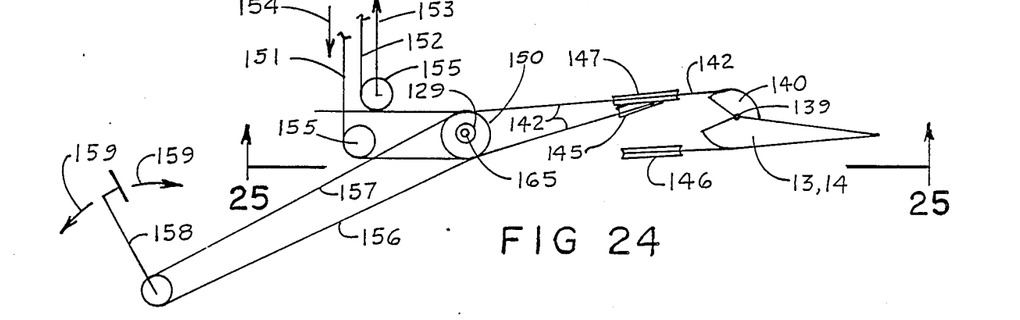
FIG. 24 shows the side view of the wing and flight station control schematic to apply roll control on the wings during airplane flight and differential directional control during VTOL hovering.
Figures 25, 26:
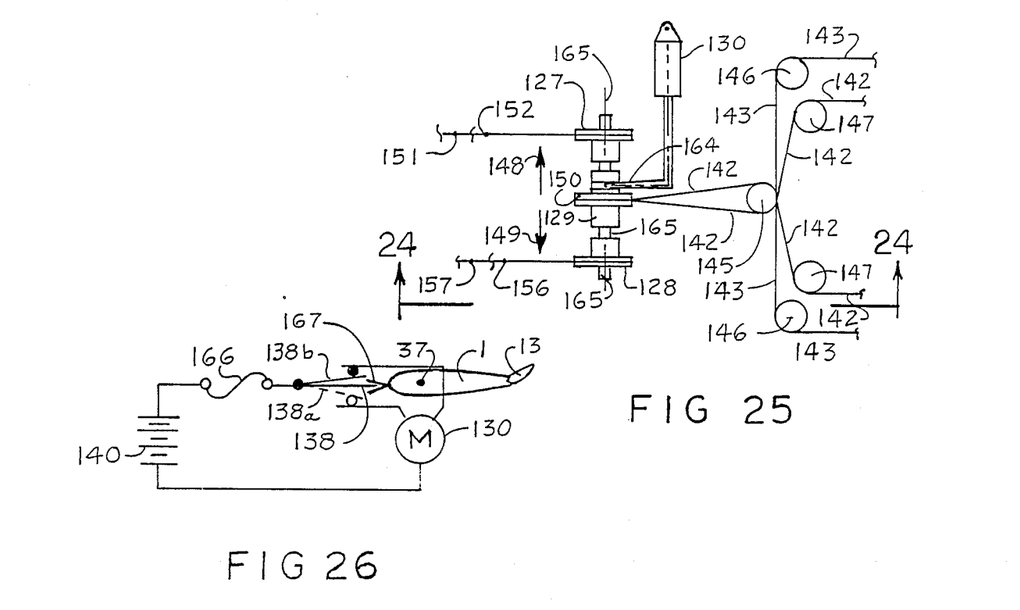
FIG. 25 is a schematic of the differential aileron control mechanism as it shifts from roll control during airplane flight mode to directional differential aileron control during helicopter VTOL hovering flight mode.
FIG. 26 shows the electronic schematic which automatically shifts the differential aileron control from aerodynamic roll control of the wings to the aerodynamic aileron differential control for directinal control during the VTOL hovering mode as the wing rotates from vertical flight during hovering mode to the horizontal flight during airplane flight mode.

Some angular attitude of the wing 1, approximately as shown in FIG. 5B and determined experimentally, a shift from rudder pedal 158 in FIG. 2 to roll wheel control 160 is automatically shifted by the schematically represented mechanism in FIGS. 24, 25, and 26.

In FIG. 24 the rudder pedals 158 for VTOL hover are engaged through control pulley 128 which engages 129 when the actuator 130 through arm 164 moves 129 to engage control pulley 128. The actuator 130 is controlled electrically in FIG. 26 through micro switch 138 which when in 138b position, determined by augular wing 1 attitude approaching vertical, provides battery power through 140, circuit breaker 166 to rotate motor M, 130. This provides the linear 149 movement through 164 of control pulley 150 to slide on shaft 165 to engage 128. The rudder control 158 is effective when moved in the arc 159 in FIG. 24.

As is seen in FIGS. 24 and 25 control cables 142 anchored in the control pulley 150 run around pulleys 147 and 145 in FIG. 24 which in FIG. 25 run to the left and right wings 1 and 2, cables 142 producing differential aileron movements about axis 139, FIGS. 24 and 25. In FIG. 25 control cable 143 interconnects aileron 13 and 14 FIGS. 24 and 3.

Roll control through the differential ailerons 13 and 14 and pilot's control wheel 160 are realized when wing 1 in FIG. 5B becomes more and more horizontal when the micro switch 138 is rotated to 138a in FIG. 26 providing a closed circuit to the battery 140 through circuit breaker 166 and motor M, 130. The linear action of 164 in FIG. 25 is then in the direction of 148 which slides control pulley 150 to engage control pulley 127 thereby providing pilot roll control at 160 by means of cables 151 and 152 in the directions of arrows 154 and 153 in FIG. 25. As is obvious with this roll control engagement, the rudder pedals 158 are disengaged. Of course, in airplane flight mode 158 pedals are at all times connected to the rudder 21 control shown in FIG. 12b as well as during the VTOL hovering mode.

Figure 6:
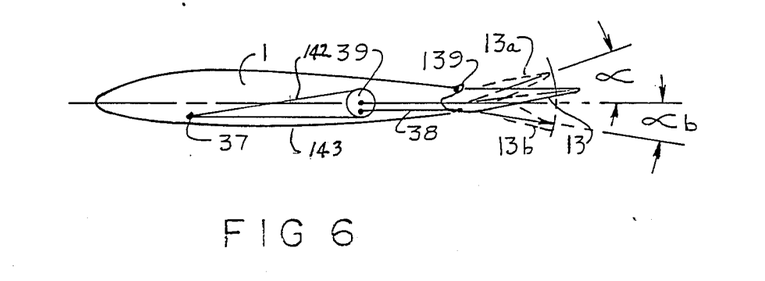
FIG. 6 is a section taken on the line 6—6 in FIG. 3 showing the angular movement of the aileron.

In FIG. 6 is shown a schematic of the aileron 13 angular movements from 13a to 13b by means of 39 cable pulley connected to rod 38, pulley 39 is rotated by cables 143 and 142 in FIGS. 6 and 25. These cables travel through the wings 1 and 2 at the pivot axis 37, FIG. 3.

Figure 6A:
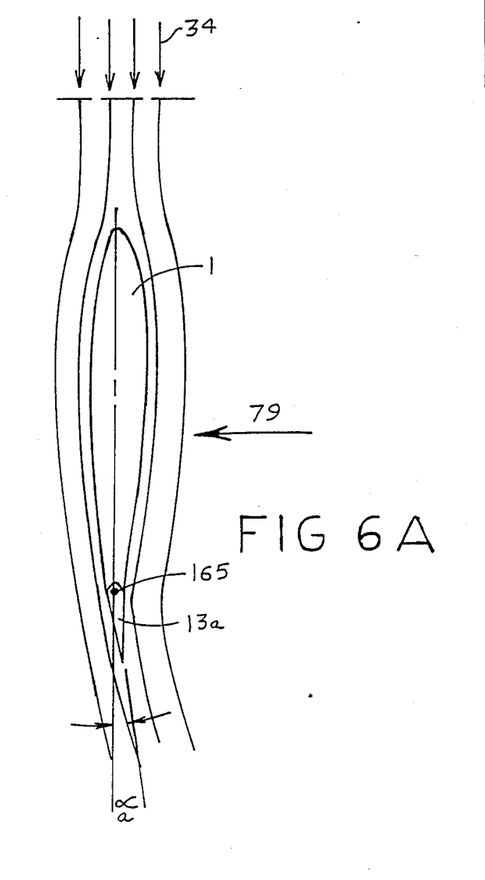
FIG. 6A and FIG. 7 are schematic views of the aerodynamic action of the wings in FIG. 5A subject to the downward airflow from the lifting rotor and the antitorque forces produced by the differential aileron positions on the left and right wings respectively, FIG. 6A being the left wing and FIG. 7 being the right wing.
Figure 7:
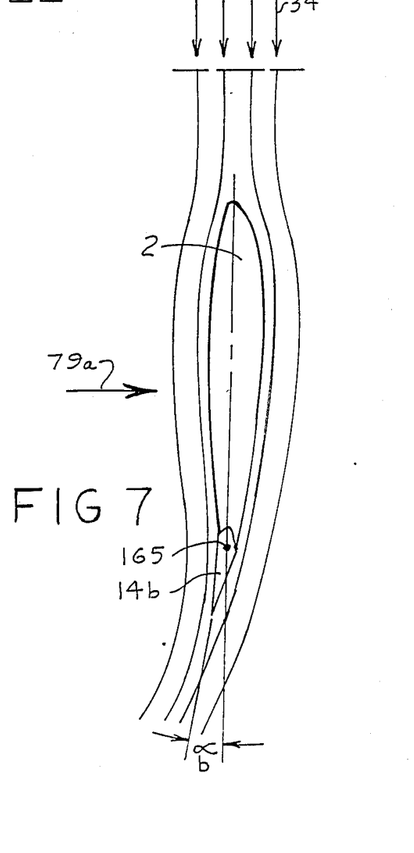

FIG. 6A and FIG. 7 shown the downward airflow 34 from the lifting rotor 8 associated with the rotor hub 6. FIG. 6A is the vertical alignment of the wing 1 as shown FIG. 6 with the airflow from the said rotor above. The differential aileron is shown in the 13a angular position. The downward airflow 34 with the 13a aileron position produces a clockwise force 79 to couter the couterclockwise torque of rotor 8 in FIG. 3 opposite to the arrows to the arrows of direction of rotation 171. FIG. 7 is a similar section to FIG. 6 of wing 2 with the differential aileron 14b in the angular position b producing also a clockwise force 79a as shown by the arrow.

In FIG. 5c the compound helicopter is shown in auto rotation with no engine power being transmitted to the rotor 8 or the pusher propeller 7. The helicopter is in a vertical descent glide with the airflow 3A vertically upward through the rotor 8. The wing 1 adjusts its attitude about axis 37 on axle 17 as shown in said FIG. 5c. The angular attitude of the wing 1 is pilot-controlled through the elevators 15 shown on wing 1 and 16 on RH wing 2.

Figures 17, 19:
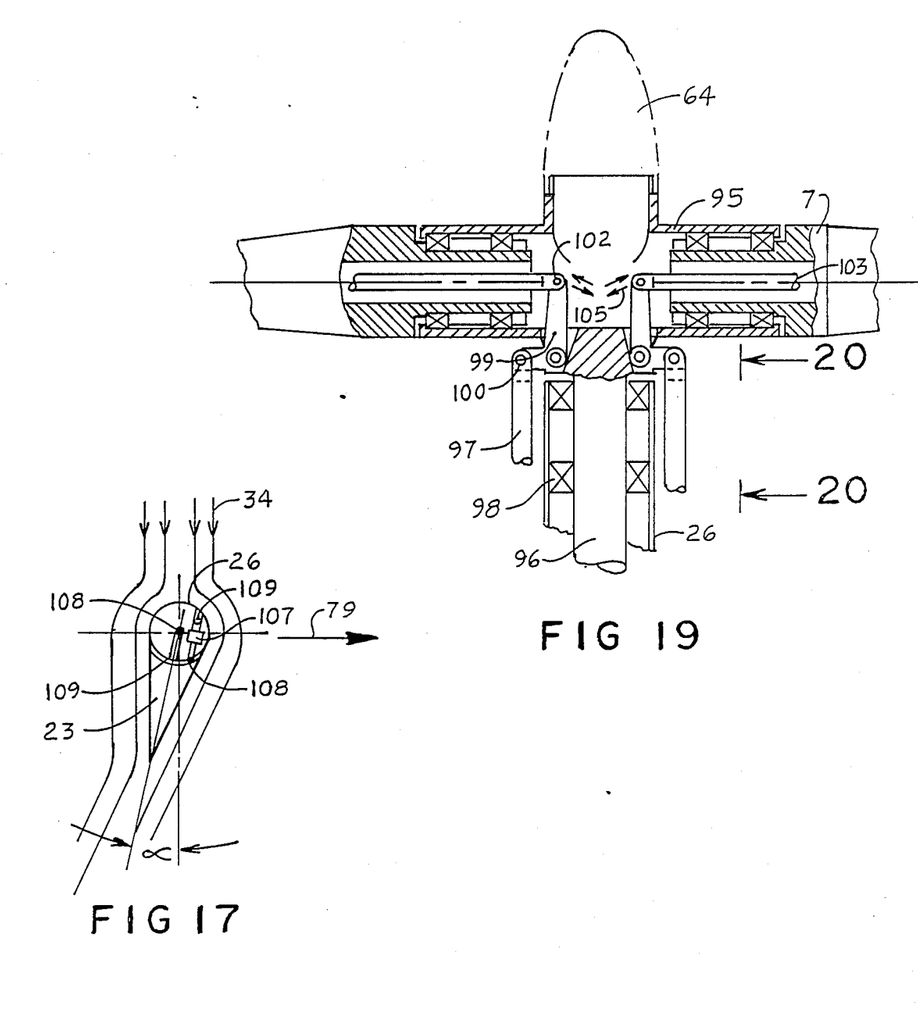
FIG. 17 is a section through the tail boom on the line 17—17 in FIG. 2 showing the schematic deflection of the air from the VTOL rotor airflow during hovering to counteract the lifting rotor torque.
FIG. 19 is a section taken on the line 19—19 in FIG. 18 shown the propeller pitch angle control mechacism in the propeller hub.

Also producing a clockwise torque reaction force in VTOL hovering is arrow 79 in FIG. 17 resulting from the rotor air 34 downflow causing an aerodynamic reaction from the angular position of the airflow 23 actuated to an angle of attack position about the tail boom 26 by the linear actuator 107. This actuator 107 is anchored at 109 to the tailboom 26 and to the aero surface 23 at 108, and is rotated about the pivot 108 also to create an angle $\alpha$.

During the hovering mode in FIG. 5A the ailerons 13 and 14 provide the anti-torque forces. They provide directional control as well as equalizing the lifting rotor torque 171 in FIG. 3. As the helicopter transitions from vertical hovering mode in FIG. 5A and horizontal flight mode in FIG. 5 the airflow from the lifting rotor 8 is shown by the 34 biased directional airflow over the fin 19 and rudder 21 in FIG. 5B. To obtain maximum directional forces from the said fin 19 and said rudder 21 in FIG. 5B transition mode the assembly is supported on a vertical axle 22 in FIGS. 2 and 12. This permits the vertical fin 19 and rudder 21 assembly to be rotated from position 73 to 74 on the arc 75 in FIG. 12. A moveable slat 20 on the leading edge is simultaneously moved from position 20 to 20a to cause the fin assemble to function aerodynamically at a higher angle of attack during the transition mode to generate the maximum anti-torque forces with greater directional control.

Figures 10, 11, 12:
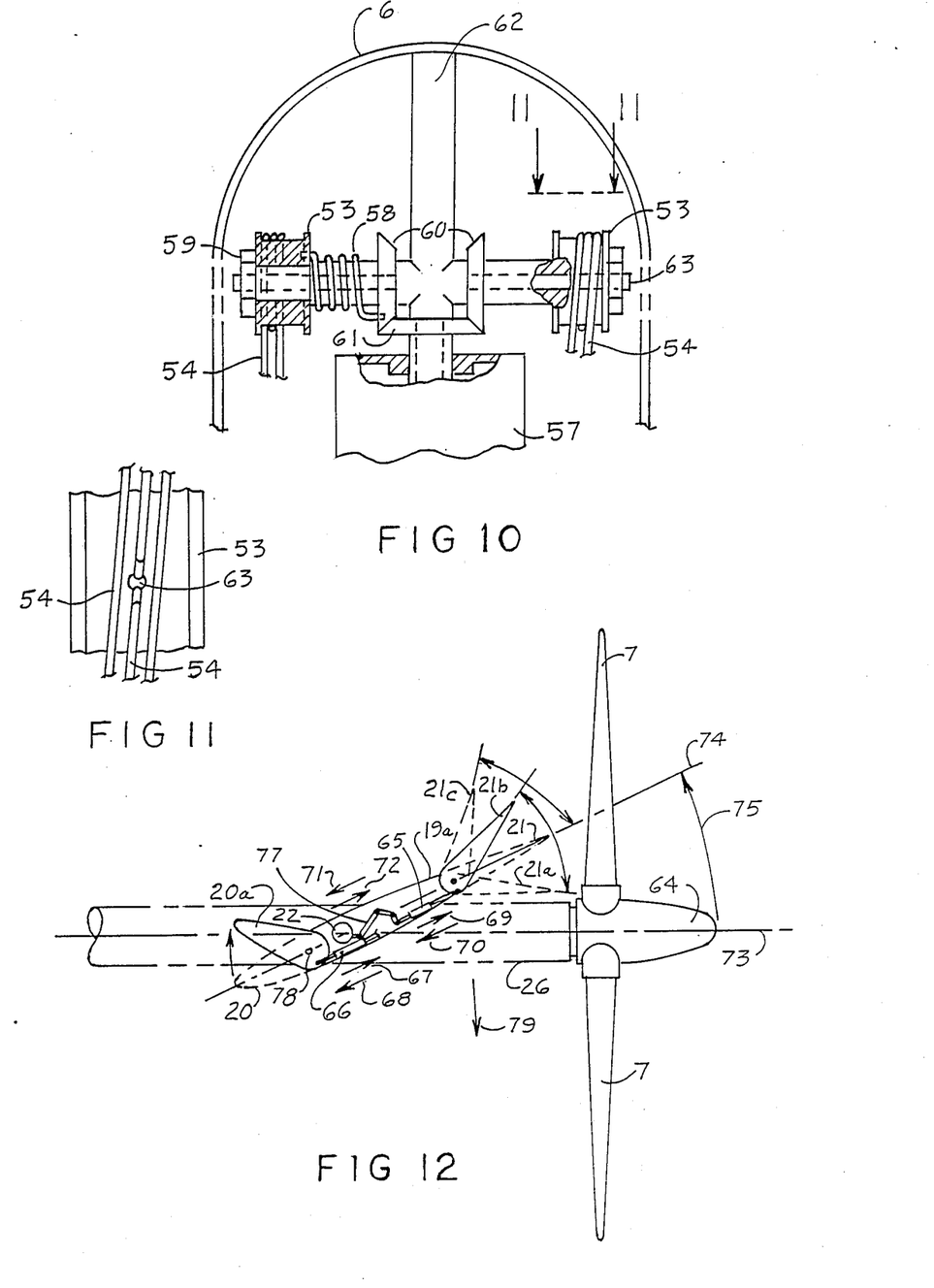
FIG. 10 is a section taken on line 10—10 in FIG. 9 showing the complete lifting rotor feathering actuator mechanism.
FIG. 11 is a view taken on line 11—11 in FIG. 10 showing the rotor feathering actuating cable secured to an actuating pulley rotated by the actuator to feather the rotor blades.
FIG. 12 is a view taken on line 12—12 in FIG. 2 showing adjustment of the vertical fin and rudder to provide direction control during transition from VTOL hovering flight and horizontal cruising flight.

The fin and rudder control 19 and 21 in FIG. 12 is normally in the attitude 73. The rudder rotates to the extremes 21a to 22b with faired position at 21. When the fin 19 and rudder 21 for transition are in the 74 attitude the said rudder 21 has a middle position of 21b with extremes of travel 21 to 21c for directional control during the transition mode from vertical hovering flight to horizontal flight.

In FIG. 12 the fin 19 is moved from 73 attitude to the 74 attitude 19a by means of 65 actuator motor, equivalent to M 130 in FIG. 26, by movement in direction 69 arrow. Simultaneously slat 20 is moved to position 20a about the pivot 78 by actuator 66 also similar to M 130 in FIG. 26 moving in the direction of 68 arrow. The rudder 21 also, then moves from faired 21 to flapped position 21b where it moves from 21c to 21 during the transitional mode in FIG. 58 for the pilot's directional control of the vehicle. To restore the fin 19, slat 20, and rudder 21 to the faired attitude 73 for horizontal flight in FIG. 5 the actuators 65 and 66 move in the direction of arrows 67 and 70. This transition occurs when the wing 1 in FIG. 26 senses the airflow through micro switch 138 senses the transition of the airflow from vertical to horizontal, FIGS. 5A, 5B, and 5. Rudder 21 in FIG. 12 is pilot controlled 21c to 21 and 21b to 21a through rudder pedals 158 during hovering mode through transition mode, and horizontal flight mode. A second set of electrical functional hardware in FIG. 26 with a wing 1 setting approximately at an angle of 15 degrees below wing 1 horizontal attitude; with the switch 138, is set to rotate the fin/rudder 19 and 21 from 73 to 74, giving maximum fin and rudder directional effectiveness during transition flight. Also electrically and simultaneously in FIG. 17 surface 23 is rotated from vertical attitude to 23 position.

Figure 16:
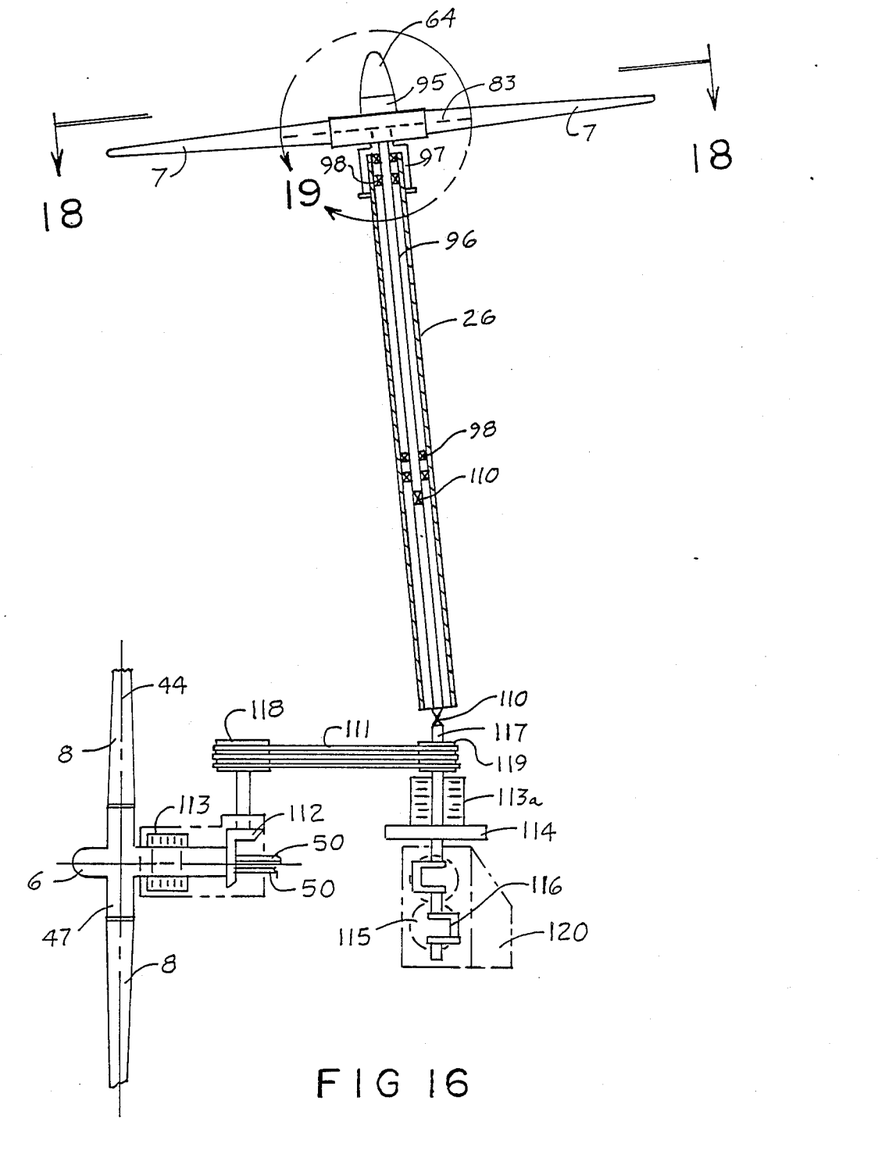
FIG. 16 is an internal schematic showing the powerplant and the power train to the lifting rotor and to the aft thrust propeller for airplane cruise flight.

The above invention, which is this patent, the applicant relies on a helicopter comprising a drive train shown in FIG. 16, a powerplant 120, a flywheel 114, a clutch 13a, drive pulleys 119 and 118, driving flexible belts 111, driving a bevel gear 112, driving a rotor hub 6, with housings 47 containing rotor blades 8 being driven through clutch 113. A rear propeller 7, in FIG. 16, is driven by the powerplant 120 through shaft 117, u-joint 110 and shaft 96. Bearings 98 retain the shaft 96 within the housing 26 and support the propeller 7, housing 95 and hub fairing 64.

Figure 8:
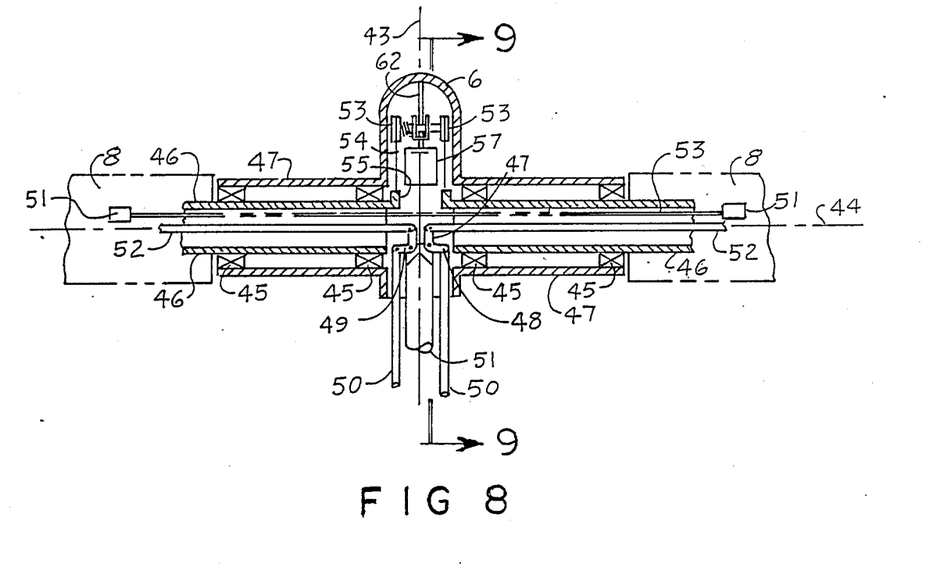
FIG. 8 is a section taken on line 8—8 in FIG. 3 showing the schematic mechanical arrangement of the lifting rotor hub and rotor feathering, and the blade angle controls.
Figure 9:
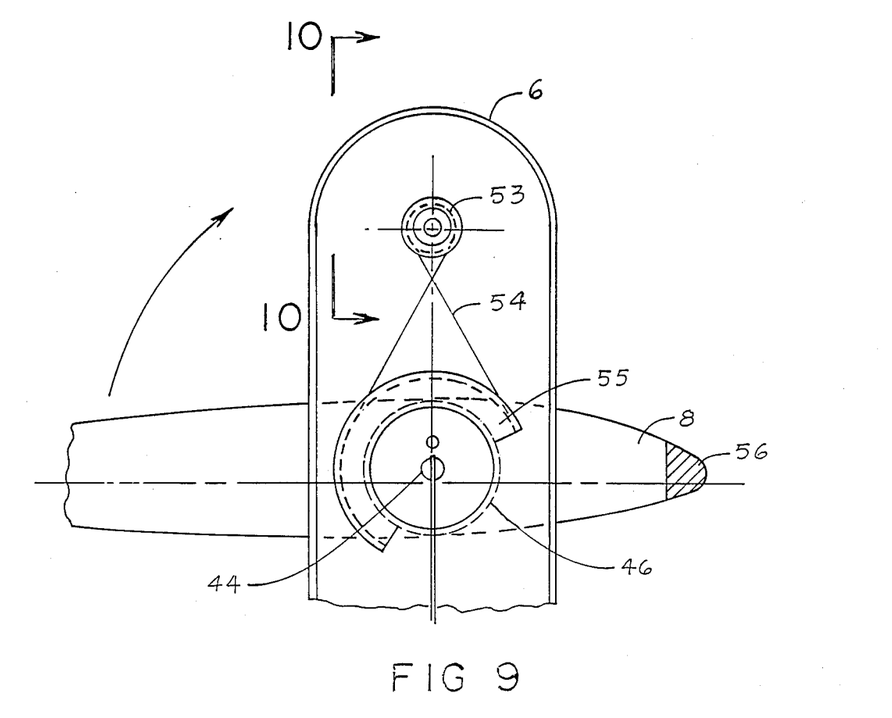
FIG. 9 is a section taken on line 9—9 in FIG. 8 showing the rotor feathering actuator mechacism.
Figure 14:
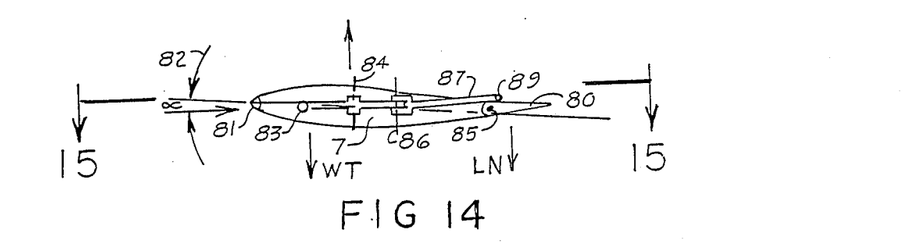
FIG. 14 is a sectional view through the above said propeller on line 14—14 in FIG. 13 showing the aerodynamic propeller pitch actuating mechanism.

In FIG. 8 the rotor blades 8 are each supported on an axle 46 which is rotationally pivoted on bearings 45. Axles 46 are hollow allowing controls 52 to extend outboard for control of the rotor blade airfoil angle through the trailing edge tabs on the rotor in FIG. 3, which was disclosed in my prior patent no. 3,563,496, and is similar to FIG. 14 of this applcation. Although FIG. 14 is dedicated to the propeller 7, the rotor blade angular control means is identical to the propeller blade control means.

The control rods 52 are associated in FIG. 8 with the rods 50 in FIG. 16, and through a conventional swash plate, the rotor is controlled by the pilot for vertical flight, in pitch, and roll of the vehicle during hovering and transition modes.

These rotor blades may be feathered for horizontal flight. As shown in the FIGS. 8, 2, and 9 by means comprising a motor 57, pulleys 53 and 55 with drive cables 54 which drive the rotor blade in FIG. 9 from horizontal shown in direction of the arcurate arrow on the left. The feathering mechanism is supported in the hub 6 by means of 62 in FIG. 8. The bearings in FIG. 8 are not highly loaded in thrust. The major centrifugal loads are taken by the cable 53 anchored to the blades 8 at 51. FIG. 2 shows the blades 8 feathered in the 8a position.

FIGS. 10 and 11 disclose the feathering features in additional detail. The actuator 57 through gears 60 and 61 drive the pulleys 53 through torsion springs 58. As shown in FIG. 11 the cables 54 are anchored to 53 by means of the swaged cable ball 63.

FIG. 19 discloses the mechanism which controls the pusher propeller 7 in FIGS. 16, 12, and 2. The blades 7 are supported within the hub 95 on bearings permitting blade angle rotation 7.

Figure 18:
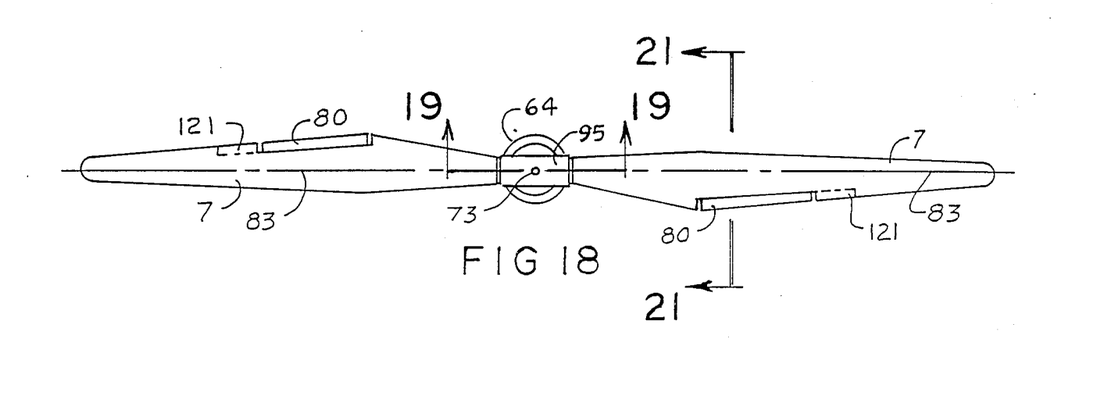
FIG. 18 is a view of the aft propeller showing the main functional mechanical elements of the said propeller.

FIG. 18 is the propeller 7 assembly comprising the main blades 7, hub 95, aerodynamic control tabs 80, fixed trim tabs 121, and hub fairing 64. The blades 7 are rotatably supported in the hub 95 on thrust bearings which retain the blades within the said hub 95.

Figure 15:
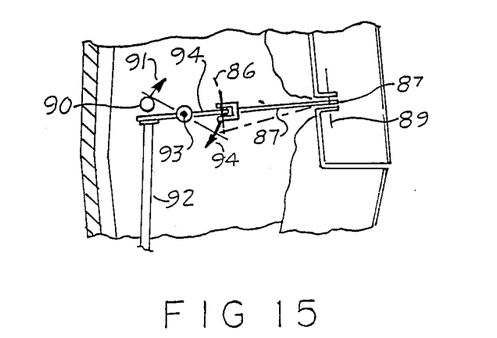
FIG. 15 is a sectional view of the above said propeller pitch control mechanism taken on line 15—15 in FIG. 14.

Control means comprising rocker arms 99 are pivotably 100 and 102 connected to control rods 97 and 103 which move rods 103 in the directions of arrows 105. Control rods 103 become 92 in FIG. 15 which rotate bell crank 94 about pivot 93. In FIG. 14 and 15, connecting rod 87 connected to tab 80 at 89 rotates tab 80 about pivot 85. Movement of this tab 80 changes the aerodynamic value of LN rotating the bladeaangle 82 of blade 7 about the axis 83 changing the thrust value at 84 in FIG. 14. This is further illustrated in FIGS. 22, 23, and 21. A counter weight 81 is added to the leading edge to statically balance the blade 7 about the pitching axis 83 in FIG. 14.

Figure 12A:
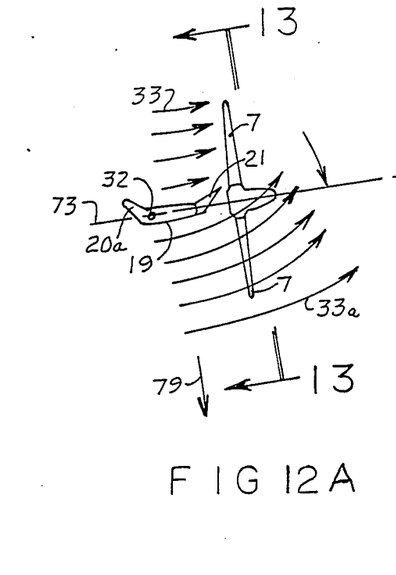
FIG. 12A is a schematic section similar to FIG. 12 above showing the aerodynamic function of the airflow during transition from VTOL hovering and airplane cruising flight.
Figure 13:
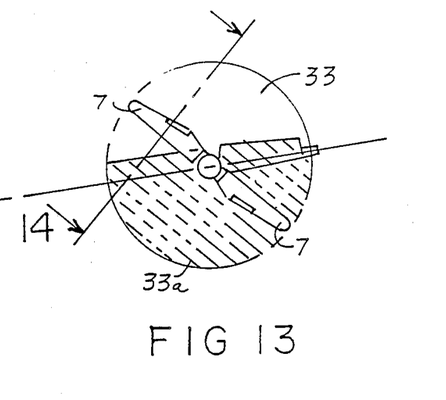
FIG. 13 is a schematic view taken on line 13—13 on FIG. 12A showing the forward thrust propeller and the aerodynamic difference in velocity through the propeller arc when the vertical is actuated for directional control.

In FIGS. 12A and 13 are illustrated the airflow 33 and 33a from the propeller over the fin 19 with the slat 20a and rudder 21 deployed. The increased velocity of airflow 33a produces an anti-torque force direction 79. Airflow 33 is the area of decreased velocity which is part of the aerodynamic force action in 79.

Figure 20:
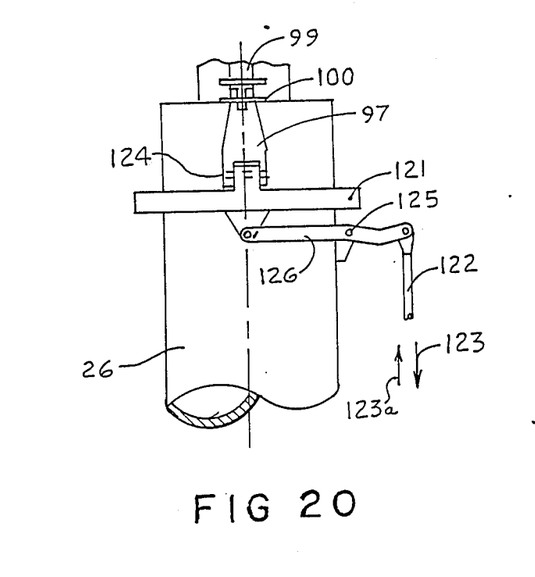
FIG. 20 is a view of the pitch control mechanism above taken on the line 20—20 in FIG. 19.
Figure 21:
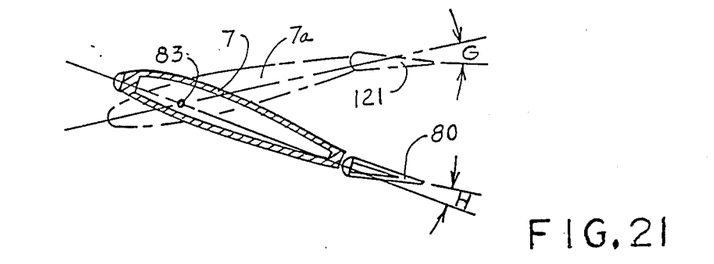
FIG. 21 is a section through the propeller blade showing the aerodynamic tab which controls the blade pitch angle shown in a positive angle.
Figure 22:
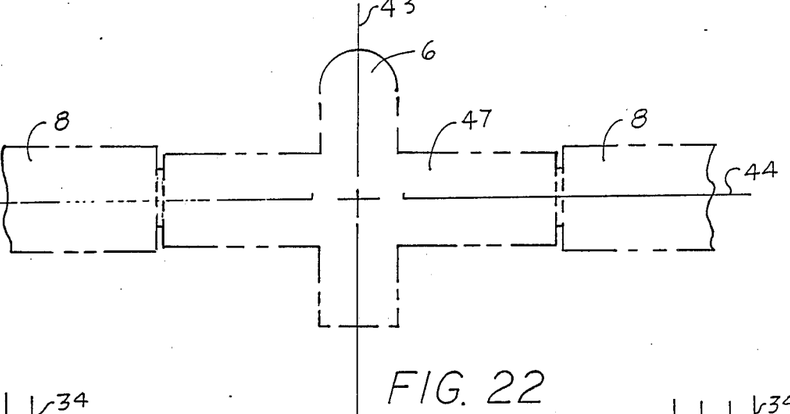
FIG. 22 is a phantom view of the lifting rotor hub in relation to the wings in FIGS. 6A and 7 when hovering.

In FIG. 20 the mechanism for varying the propeller 7 blade angle 82 in FIG. 14 is illustrated. Linkage 122 is connected to the pilot's control and is moved in the directions of 123 and 123a which rotates the arm 126 about pivot point 125. This moves the rotating collar 121 vertically, and through 97 links in FIGS. 20 and 19 actuates the aerodynamic tabs 80 in FIGS. 21, 18, and 14.

OPERATION

As shown in FIGS. 1, 2, and 3 the no-tail-rotor compound helicopter as disclosed comprises a conventional helicopter chassis configuration with a large overhead lifting rotor, a powerplant with a drive train to the rotor. Additionally, a tail pusher propeller with pitch control with a drive train from the said powerplant to the said pusher propeller is provided. To this configuration is added a free floating wing assembly with the left and right wings interconnected for simultaneous rotation angularily in the same instant direction about a horizontal pivot which is controlled by aerodynamic responses to the trim tabs on the wings in roll and in pitch. The tail boom contains an airfoil configuration to produce aerodynamic forces counter to the torque producing forces from the lifting rotor. The fin and rudder assembly are designed to rotate as an assembly to produce maximum anti-torque and directional control forces during transition from the hovering mode to the horizontal flight mode. These modes are sensed and the force reactions are semi-automatically produced and are based on the wing's sensing the hovering mode, the transition mode, and the horizontal flight mode. The wing 1 attitude angle is the indicator of the progress of the transition from vertical flight and horizontal flight. The electrical functions of the switch 138 in FIG. 26 sense the attitude and schedule the fin 19 and rudder 21 attitude in FIG. 12. Since there are two of these electrical systems, scheduling of the rudder pedals functioning with the ailerons on the wings is scheduled for another angular attitude of the wings.

As it is seen the various functional performance changes required of the ailerons, the fin and rudder, and the tail boom fairing surface performance is sensed and scheduled by the wings 1 attitude. Therefore the flight of the compound helicopter during transition does not over burden the pilot's control of the vehicle, since the functional changes as said above are automatically sensed by the wing 1.

The above comprises the functional details and mechanisms of the no-tail-rotor compound helicopter. The invention is shown herein in what is conceived to be the most practical and preferred embodiments. It is recognized that departures may be made there from within the scope of the invention which is not to be limited to the illustrative details disclosed.

I claim:

1. In combination a compound helicopter with lifting rotor for flight comprising horizontally supported wings, left and right, on a horizontal axle means free to rotate with the direction of airflow, the said left and right wings fixedly secured to the said axle, a fuselage between the said wings to support the wings, bearing means associated with the fuselage and wing axle means for free rotation of the wings with respect to the said fuselage, the wings having counter balancing weight means to statically balance the wings about the axle axis of rotation, moveable aerodynamic control tab means on the trailing edges of the wings to vary and to control the wing angle attitude relative to the airflow direction over the wings, outboard ailerons on said wings to vary differentially the lift forces of the outer wing tips.

2. In combination a compound helicopter with lifting rotor for flight comprising horizontally spanwise supported wings, left and right, hingedly supported on a horizontal pivot for free rotation with the direction of airflow over the wings, a fuselage to support the said wings, the said wings fixedly interconnected by direct mechanical means one to the other so that an angular direction of rotation on the said horizontal pivot of the one wing instantly and fixedly transfers to the other wing a similar angular direction of rotation, the wings having a counter weight means to statically balance the said wings about the said horizontal pivot, moveable aerodynamic control tab means to provide aerodynamic pitching moments to control the wings with respect to the direction of the airflow, outboard ailerons on the said wings to vary the lift forces of the outer wing tips differentially.

3. In combination a compound helicopter as in claim 1 comprising an overhead lifting rotor for vertical and horizontal flight, a pilot's rudder control means associated with the said outer wing tip differential aileron lift forces to oppose the torque forces of the said rotor and to directionally control the helicopter in the hovering flight mode when the wings are vertically disposed on the horizontal axis in response to the vertical airflow from the overhead rotor.

4. In combination a compound helicopter as in claim 2 comprising an overhead lifting rotor for vertical and horizontal flight, a pilot's rudder control means associated with the said outer wing tip aileron differential lifting forces to oppose the said rotor torque forces and to directionally control the helicopter during the hovering flight mode when the wings have been vertically disposed on the said horizontal pivot in response to the vertical airflow from the helicopter rotor.

5. In combination a compound helicopter with a lifting rotor as in claim 1 comprising pilot's flight controls for roll and you control of the said differential lift forces of the said ailerons.

6. In combination a compound helicopter as in claim 4 for vertical and horizontal flight with pilot controls for roll control of the said differential lift forces of the said ailerons.

7. In combination a compound helicopter as in claim 6 comprising means to shift the said differential lift forces of the said ailerons for directional control during the hovering mode to differential roll control during horizontal flight mode, the pilot's control providing rudder pedal directional control means in the hovering mode, and tranfer means to the aileron pilot's control means for roll control as the wings rotate into horizontal flight.

8. In combination a compound helicopter as in claim 7 for vertical and horizontal flight comprising a pilot's control shifting mechanism means to select the pilot's rudder control pedals for directional control in the hovering mode, and to select the pilot's control shifting mechanism means comprising a sensing means associated with the wings angular direction during transition from the hovering mode to the horizontal flight mode, the said sensing means driving the pilot's flight controls from rudder pedals to pilot's roll controls and vice versa when transitioning from the horizontal flight mode to the vertical and hovering flight mode.

9. In combination a compound helicopter for vertical and hovering flight and high speed horizontal flight as an airplane said combination comprising a helicopter lifting rotor, a fuselage body, horizontal wings in the airflow over the wings on a horizontal axle, for free rotation with the direction of airflow, bearings associated with the fuselage and said wing's axle supporting the wings, the wings having hingedly supported aerodynamic tab means to provide pitching moments within the airflow over the wings, for lifting control, the wings secured fixedly to each other to respond instantly to each other in angular rotation, ailerons attached to the outboard wing tips to provide differential lift forces for the wings to control the direction of flight and rotor lifting torque during hovering and for roll control during airplane horizontal flight, pilot's rudder controls to control the ailerons in hovering mode for directional control, and pilot's aileron roll controls for horizontal airplane flight, sensing means comprising the wing and an associated switch to transition the pilot's control of the wing ailerons from rudder control to aileron roll control, the pilot's control transitioning means comprising motor actuated linkages shifting the ailerons in hovering mode from pilot's rudder pedal control to pilot's aileron roll control when the wings are horizontal in airplane flight, tail boom support means, horizontal and vertical tail surfaces, a pusher propeller for thrust means, means in the said lifting rotor hub comprising rotor blades hingedly supported in the hub with motor actuated means to rotate the rotor blades into feathered airfoil vertical position for stipped rotor during airplane flight.

* * * * *